United States Patent [19]

Smith et al.

[11] Patent Number: 4,807,953
[45] Date of Patent: Feb. 28, 1989

[54] APPARATUS AND METHOD FOR FREQUENCY LOCKING ELECTROMAGNETIC OPTICAL SIGNALS

[75] Inventors: David W. Smith; David Cotter, both of Woodbridge; Richard Wyatt, Martlesham Heath, all of United Kingdom

[73] Assignee: British Telecommunications public limited company, United Kingdom

[21] Appl. No.: 2,694

[22] PCT Filed: May 9, 1986

[86] PCT No.: PCT/GB86/00254

§ 371 Date: Jan. 5, 1987

§ 102(e) Date: Jan. 5, 1987

[87] PCT Pub. No.: WO86/06886

PCT Pub. Date: Nov. 20, 1986

[30] Foreign Application Priority Data

May 9, 1985 [GB] United Kingdom ............... 8511688

[51] Int. Cl.⁴ .................... G02B 6/26; G02F 1/00
[52] U.S. Cl. .................... 350/96.15; 350/96.16; 350/96.29; 350/320; 455/600; 455/602; 455/610; 455/612
[58] Field of Search ............. 350/96.15, 96.16, 96.10, 350/96.30, 96.29, 320; 372/3, 6, 92, 94, 97; 455/600, 602, 609, 610, 612, 617; 370/1, 3

[56] References Cited

U.S. PATENT DOCUMENTS

| | | | |
|---|---|---|---|
| 3,469,107 | 9/1969 | Townes et al. | 455/609 X |
| 3,645,603 | 2/1972 | Smith | 350/149 |
| 4,005,935 | 2/1977 | Wang | 455/609 X |
| 4,063,106 | 12/1977 | Ashkin et al. | 372/3 X |
| 4,107,628 | 8/1978 | Hill et al. | 372/6 X |
| 4,166,946 | 9/1979 | Chown et al. | 250/199 |
| 4,294,513 | 10/1981 | Nelson et al. | 350/96.29 |
| 4,301,543 | 11/1981 | Palmer | 367/149 |
| 4,307,933 | 12/1981 | Palmer et al. | 350/96.16 |
| 4,307,937 | 12/1981 | Gordon | 350/96.29 |
| 4,378,143 | 3/1983 | Winzer | 350/96.15 |
| 4,490,163 | 12/1984 | Jochem et al. | 65/4.21 |
| 4,525,818 | 6/1985 | Cielo et al. | 367/149 |

(List continued on next page.)

FOREIGN PATENT DOCUMENTS

| | | |
|---|---|---|
| 2473-188 | 7/1981 | France . |
| 58-211119 | 12/1983 | Japan . |
| 59-126696 | 7/1984 | Japan ............... 372/6 |
| WO83/03684 | 4/1982 | PCT Int'l Appl. . |
| WO83/02496 | 1/1983 | PCT Int'l Appl. . |
| WO85/00221 | 6/1983 | PCT Int'l Appl. . |

OTHER PUBLICATIONS

"Stimulated Brillouin Scattering in Monomode Optical Fibre", Journal of Optical Communications 4(1983) 1, 10–19. D. Cotter.

(List continued on next page.)

Primary Examiner—William L. Sikes
Assistant Examiner—Brian M. Healy
Attorney, Agent, or Firm—Nixon & Vanderhye

[57] ABSTRACT

A method and apparatus for generating a plurality of electromagnetic signals, primarily optical signals, having linewidths centered on frequencies fixed relatively to a reference frequency. The apparatus comprises a reference frequency signal source such as a gas laser (1) which generates a reference signal having a frequency $f_p$. This reference signal is fed to a leading one (3) of a plurality of optical fibre ring lasers (3, 11, 16) connected together in series by optical fibres (6, 12). The characteristics of the injected signal and the form of the waveguide ring (5) defined by the ring laser (3) is such that stimulated Brillouin scattering occurs in the waveguide ring to generate a scattered signal with a frequency $f_p$-$f_A$ traveling in an opposite direction to the injected signal. This scattered signal is passed by the optical fibres (6) via an isolation device (7) to the next ring laser (11) in series. Directional couplers (2, 10, 15) are provided to guide the injected signals, including the reference signal to respective output ports (9, 14, 17). The stimulated Brillouin scattering effect causes each scattered wave to be offset from the corresponding injected wave by a fixed frequency ($f_A$).

10 Claims, 1 Drawing Sheet

OTHER PUBLICATIONS

Sheem et al., "Wavelength Monitoring of Single-Mode Diode Laser Using Guided Wave Interferometer", *Optics Letters*, May 1980, vol. 5, No. 5, pp. 179–181.

Davis, "Fiber Optic Sensors: an Overview", SPIE, vol. 478, May 1984, pp. 12–18.

Pavlath, "Applications of All Fiber Technology to Sensors", *Proc. SPIE*, (Int. Soc. Opt. Eng.), vol. 412, 5–7, Apr. 1983, pp. 70–79.

Optics Communications, vol. 26, No. 2, Aug. 1978 (Amsterdam, NL) Y. H. Meyer: "Frequency Locking of Dye Lasers by Intracavity Stimulated Raman Scattering", pp. 161–264, see particularly the abstract.

Optics Letters, vol. 10, No. 2, Feb. 1985, Optical Society of America, (New York, US), E. Desurvire et al: "Raman Amplification of Recirculating Pulses in a Reentrant Fiber Loop", pp. 83–85, see especially abstract and FIG. 1.

Optics Letters, vol. 7, No. 10, Oct. 1982, Optical Society of America, (New York, US) L. F. Stokes et al: "All-Fiber Stimulated Brillouin Ring Laser with Submilliwatt Pump Threshold", pp. 509–511, see abstract; FIG. 1.

U.S. PATENT DOCUMENTS

| Patent No. | Date | Inventor | Class |
|---|---|---|---|
| 4,530,097 | 7/1985 | Stokes et al. | 372/6 |
| 4,530,603 | 7/1985 | Shaw et al. | 356/345 |
| 4,545,253 | 10/1986 | Avicola | 73/655 |
| 4,558,920 | 12/1985 | Newton et al. | 350/96.15 |
| 4,588,255 | 5/1986 | Tur et al. | 350/96.16 |
| 4,588,296 | 5/1986 | Cahill et al. | 356/350 |
| 4,606,020 | 8/1986 | Ruffin | 370/3 |
| 4,616,898 | 10/1986 | Hicks, Jr. | 350/96.15 |
| 4,630,885 | 12/1986 | Haavisto | 350/96.15 |
| 4,632,551 | 12/1986 | Pavlath | 356/345 |
| 4,633,170 | 12/1986 | Burns | 324/77 K |
| 4,635,246 | 1/1987 | Taylor et al. | 370/3 |
| 4,648,082 | 3/1987 | Savit | 367/149 |
| 4,648,083 | 3/1987 | Giallorenzi | 367/149 |
| 4,653,916 | 3/1987 | Henning et al. | 356/345 |
| 4,666,255 | 5/1987 | Taylor etal. | 350/96.29 X |
| 4,676,583 | 6/1987 | Hicks, Jr. | 350/96.15 |
| 4,676,585 | 6/1987 | Shaw et al. | 350/96.15 |
| 4,684,215 | 8/1987 | Shaw et al. | 350/96.29 |
| 4,697,876 | 10/1987 | Dyott | 350/96.29 |
| 4,697,926 | 10/1987 | Youngquist et al. | 356/345 |
| 4,707,061 | 11/1987 | McMahon | 350/96.16 |
| 4,715,028 | 12/1987 | McMahon et al. | 455/612 X |
| 4,720,160 | 1/1988 | Hicks, Jr. | 350/96.15 |
| 4,730,301 | 3/1988 | McMahon | 370/3 |
| 4,742,576 | 5/1988 | McMahon | 455/610 X |

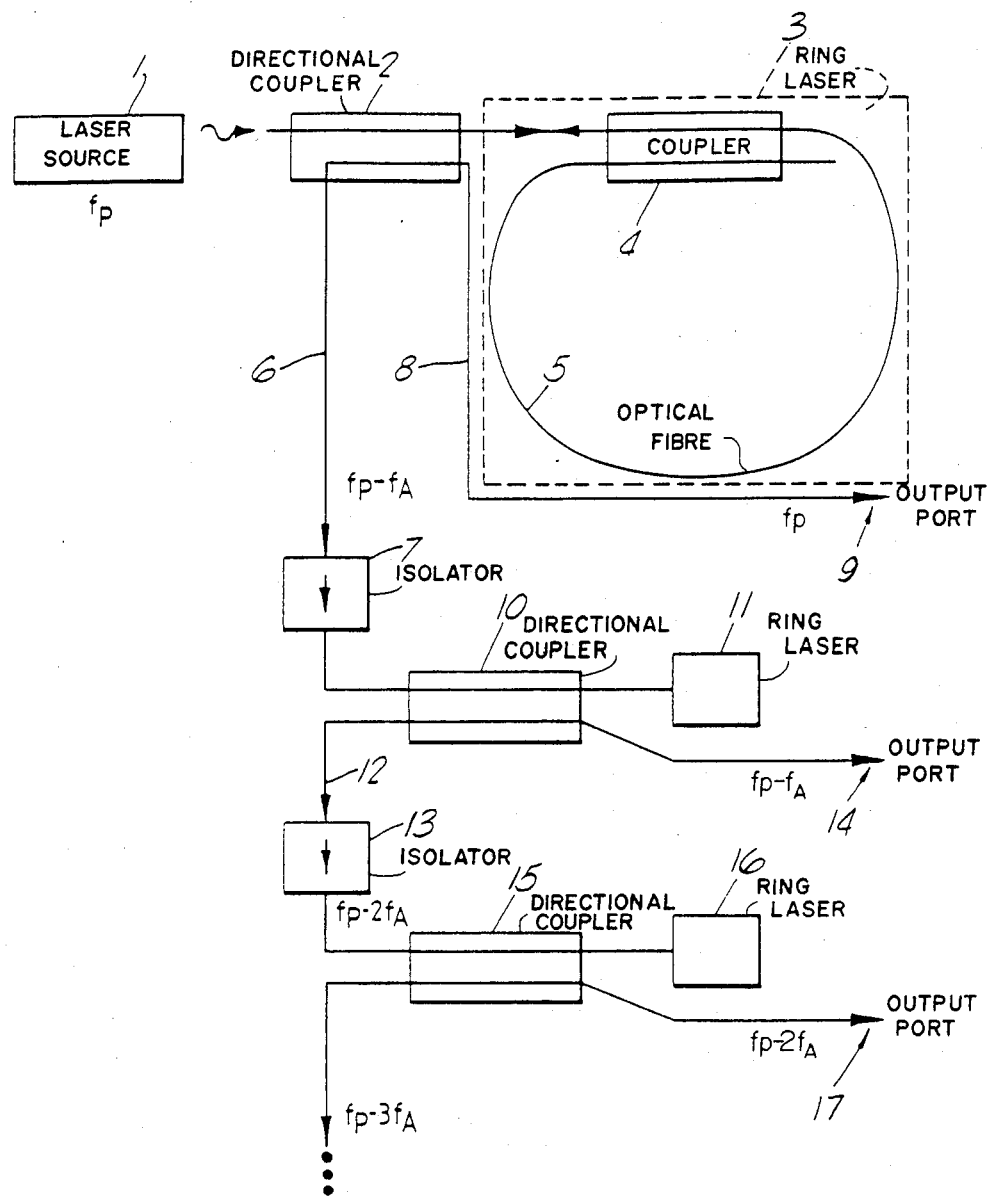

APPARATUS AND METHOD FOR FREQUENCY LOCKING ELECTROMAGNETIC OPTICAL SIGNALS

This application is related to my copending U.S. application Ser. No. 002,717 filed Jan. 5, 1987.

BACKGROUND OF THE INVENTION

The invention relates to methods and apparatus for generating a plurality of electromagnetic signals having linewidths centered on frequencies fixed relatively to a reference frequency.

The generation of a bank of frequency referenced electromagnetic signals is particularly important in the field of wide band communication, for example using optical wavelengths, where it is very important to be able to control closely the wavelengths or frequencies of the transmitted signals. Indeed, the more channels which are transmitted, the more important it is to control the frequency of the signals and in particular their spacing.

SUMMARY OF THE INVENTION

In accordance with one aspect of the present invention, a method of generating a plurality of electromagnetic signals having linewidths centered on frequencies fixed relatively to a reference frequency comprises (a) injecting at least a portion of a reference frequency signal into a first waveguide ring, the characteristics of the signal and the form of the ring being such that scattering occurs to generate a first scattered signal travelling in an opposite direction to the reference frequency signal;

(b) injecting at least a portion of the first scattered signal into a second waveguide ring, the characteristics of the first scattered signal and the form of the second waveguide ring being such that scattering occurs to generate a second scattered signal travelling in an opposite direction to the first scattered signal;

(c) repeating step (b) n times with the second and successive scattered signals and respective waveguide rings; and (d) guiding portions of at least two of the reference and scattered signals to respective output ports whereby the plurality of electromagnetic signals having frequencies fixed relatively to a reference frequency are provided at the output ports.

In its simplest form, n = 0. In this case and in some other cases the plurality of electromagnetic signals includes a signal with the same frequency as the reference signal.

Preferably, the characteristics of the or each signal and ring are such that stimulated Brillouin scattering occurs.

In accordance with a second aspect of the present invention, apparatus for generating a plurality of electromagnetic signals having linewidths centred on frequencies fixed relatively to a reference frequency comprises a reference frequency signal source; a plurality of waveguide rings connected together in series by waveguide means, the reference frequency signal source being arranged to inject at least a portion of the reference frequency signal into a leading one of the waveguide rings, the characteristics of each signal injected into a waveguide ring and the form of the waveguide ring being such that scattering occurs in each waveguide ring to generate a scattered signal travelling in an opposite direction to the injected signal, the waveguide means being arranged to pass at least a portion of the scattered signal to the next waveguide ring in series and to pass portions of at least two of the injected and reference signals to respective output ports.

Preferably, the characteristics of each signal injected into a waveguide ring and the form of the waveguide ring is such that stimulated Brillouin scattering occurs in each waveguide ring.

It is possible that other scattering phenomena such as Raman scattering would be feasible but much higher pump powers would be required.

The resonance phenomenon known as stimulated Brillouin scattering (SBS) has until now been considered a limitation on the transmission of radiation through waveguides. It is particularly apparent in the transmission of optical wavelengths along dielectric waveguides and occurs in low loss optical fibres if narrow linewidth laser light of above a central power level threshold is injected.

The principle of SBS will now be described in connection with optical radiation. SBS can be described essentially as a coupled three-wave interaction involving the incident light wave (pump), a generated acoustic wave, and the scattered light wave (Stokes). The pump creates a pressure wave in the medium due to electrostriction and the resultant variation in density changes the optical susceptibility. Thus the incident light wave pumps the acoustic wave which scatters it and the scattering creates the Stokes wave.

The three waves obey the energy conservation law which relates the three frequencies by:

$$f_A = f_L - f_S$$

where the subscripts L, S, A refer to the laser (pump), Stokes and acoustic frequencies respsectively. Maximum power transfer occurs when the wave-vector mismatch is zero:

$$k_A = k_L - k_S$$

There are two important consequences of these two equations. Firstly, the Stokes wave experiences maximum gain when the pump and Stokes wave vectors are parallel and counter-directional. Thus in a monomode fibre SBS generates a backward-travelling Stokes wave. Secondly, the Stokes wave is shifted to a lower frequency with respect to the pump by an amount equal to the acoustic frequency.

The shift in frequency of the Stokes wave is by an amount equal to the acoustic frequency and is defined as:

$$f_A = 2v_A n \lambda$$

where $v_A$ is the acoustic velocity, n is the refractive index of the waveguide and $\lambda$ is the optical wavelength in the waveguide.

It should be noted that the frequency shift depends upon the properties of the waveguide medium and on the injected wave. This frequency shift is thus relatively independent of changes in ambient conditions such as changes in temperature. This means that there will be a relatively fixed frequency shift between each injected signal and the corresponding scattered signal.

If the waveguide rings are formed of the same material then this frequency shift will be the same amount but different frequency shifts can be achieved by using different media.

In one example, where an optical signal is injected into an optical fibre formed of fused silica, a frequency shift of 11.1 GHz is obtained. In this example, $v_A = 5960$ m/s, $\lambda = 1.55$ μm, and $n = 1.44$.

In general, the waveguide rings will be physically separate but it is feasible to use a common ring.

At each stage signal power will decrease until no further scattering can take place. To deal with this amplifiers may be included between rings. These may comprise semiconductor laser oscillator amplifiers or be based on scattering effects such as Raman or SBS.

Preferably, isolating means is provided between successive waveguide rings to prevent a scattered signal being guided to an upstream waveguide ring. Such isolators may be based on Faraday rotation.

Typically, the electromagnetic signals comprise optical signals and in this specification, the term optical is intended to refer to that part of the electromagnetic spectrum which is generally known as the visible region together with those parts of the infra-red and ultra-violet regions at each end of the visible region which are capable of being transmitted by dielectric optical waveguides such as optical fibres. For example, the signals may have wavelengths in the range 0.5 μm–10 μm.

The banks of signals produced by the invention can find application in wideband communication networks. The signals may be used to provide both transmit and local oscillator signals.

BRIEF DESCRIPTION OF THE DRAWING

An example of a method and apparatus for generating a plurality of optical signals having linewidths centred on frequencies fixed relatively to a reference frequency is illustrated in the accompanying schematic block diagram.

DETAILED DESCRIPTION OF AN EXEMPLARY EMBODIMENT

The apparatus comprises a laser 1 which may comprise a gas laser for generating a narrow linewidth output signal or alternatively a semiconductor laser such as a diode laser or distributed feedback laser generating a relatively broad linewidth output signal. In any case the output signal has a substantially constant frequency. The output signal is fed via a directional coupler 2 to an optical fibre ring laser 3. The ring laser 3 comprises an optical coupler 4 and an optical fibre ring 5 constituted by monomode optical fibre. This is described in more detail in an article by L. F. Stokes et al in Optics Lett 7 (1982) pp 500–511.

The wavelength of the pump laser 1 may be for example 0.63 μm with a pump power of 0.56 mW. Lower pump powers may be possible with lower loss fibre rings. The length of the ring 5 may be 10 meters. With these pump powers and wavelengths, SBS occurs and a scattered wave travelling back towards the directional coupler 2 is generated. The directional coupler 2 separates this scattered wave from the injected wave and passes the scattered wave along an optical fibre 6 to an isolation device 7.

The directional coupler 2 also directly couples the reference signal from the laser 1 to an optical fibre 8 which feeds the signal with a frequency $f_P$ to an output port 9.

The scattered wave has a frequency shifted from the incoming wave of $f_P - f_A$. In the case of fused silica fibre ring, $f_A$ may equal 11.1 GHz. Furthermore, this wave will have a narrow linewidth due to the properties of the fibre ring and irrespective of the linewidth of the injected reference signal.

The scattered wave passing through the isolation unit 7 is guided to another directional coupler 10, similar to the coupler 2 and from there to a ring laser 11 similar to the laser 3. The ring laser 3 generates another scattered wave which is coupled by the coupler 10 to an optical fibre 12 connected to an isolation unit 13. The frequency of this wave is $f_P - 2f_A$ since the ring laser 11 has the same form as the ring laser 3 i.e. is made of a medium with the same refractive index.

The wave output from the isolation unit 7 is also passed by the coupler 10 directly to an output port 14.

In a similar way the scattered wave from the coupler 10 is passed via the isolation unit 13 to another directional coupler 15 and ring laser 16. This generates a scattered wave having a frequency $f_P - 3f_A$ which can be fed further downstream to another ring laser and so on. The scattered wave from the isolation unit 13 is also fed directly to an output port 17.

It will be seen therefore that at the output ports 9, 14, 17 etc. optical signals are provided each of which is offset from the upstream signal by a fixed frequency ($f_A$) which in this example is the same. These output signals can then be used in any conventional optical transmission system either as carried signals or local oscillator signals for detection purposes.

It may be necessary in some cases to adjust the length of the fibre rings 5 in which case the optical fibre may be wound on a piezoelectric cylinder to which a control voltage is applied.

We claim:

1. A method of generating a plurality of electromagnetic signals having linewidths centred on frequencies fixed relatively to a reference frequency, the method comprising
   (a) injecting at least a portion of a reference frequency signal into a first waveguide ring, the characteristics of the signal and the form of the ring being such that scattering occurs to generate a first scattered signal travelling in an opposite direction to the reference frequency signal;
   (b) injecting at least a portion of the first scattered signal into a second waveguide ring, the characteristics of the first scattered signal and the form of the second waveguide ring being such that scattering occurs to generate a second scattered signal travelling in an opposite direction to the first scattered signal;
   (c) repeating step (b) n times with the second and successive scattered signals and respective waveguide rings; and
   (d) guiding portions of at least two of the reference and scattered signals to respective output ports whereby the plurality of electromagnetic signals having frequencies fixed relatively to a reference frequency are provided at the output ports.

2. A method according to claim 1, wherein portions of all the scattered signals and the reference signal are guided to respective output ports.

3. A method according to claim 1 or claim 2, wherein $n = 0$.

4. A method according to any of the preceding claims 1 or 2, wherein the electromagnetic signals comprise optical signals.

5. A method according to any of the preceding claim 1 or 2, wherein the characteristics of the or each signal and ring are such that stimulated Brillouin scattering occurs.

6. Appartus for generating a plurality of electromagnetic signals having linewidths centred on frequencies fixed relatively to a reference frequency, the apparatus comprising a reference frequency signal source; a plurality of waveguide rings connected together in series by waveguide means, the reference frequency signal source being arranged to inject at least a portion of the reference frequency signal into a leading one of the waveguide rings, the characteristics of each signal injected into a waveguide ring and the form of the waveguide ring being such that scattering occurs in each waveguide ring to generate a scattered signal travelling in an opposite direction to the injected signal, the waveguide means being arranged to pass at least a portion of the scattered signal to the next waveguide ring in series and to pass portions of at least two of the injected and reference signals to respective output ports.

7. Apparatus according to claim 6, wherein the waveguide rings are substantially the same whereby each scattered signal is offset from the corresponding injected signal by substantially the same frequency.

8. Apparatus according to claim 6 or claim 7, wherein isolating means is provided between successive waveguide rings to prevent a scattered signal being guided to an upstream waveguide ring.

9. Apparatus according to any of claims 6 or 7, wherein the characteristics of each signal injected into a waveguide ring and the form of the waveguide ring is such that stimulated Brillouin scattering occurs in each wavguide ring.

10. Apparatus for generating a plurality of electromagnetic optical signals having linewidths centered on frequencies fixed relative to a reference frequency, said apparatus comprising:
an optical reference frequency signal source; and
a plurality of serially connected means for receiving an input optical signal of a first frequency and for providing an output optical signal of a second frequency offset from said first frequency;
one of said serially connected means being means being connected to receive an optical reference frequency signal from said source.

* * * * *